Nov. 24, 1942. M. M. HORNISH Re. 22,225

TRACTOR DRAWN IMPLEMENT

Original Filed Nov. 29, 1940 2 Sheets-Sheet 1

Inventor
Mars M. Hornish
By Paul O. Piper
Atty.

Nov. 24, 1942. M. M. HORNISH Re. 22,225

TRACTOR DRAWN IMPLEMENT

Original Filed Nov. 29, 1940 2 Sheets-Sheet 2

Inventor
Mars M. Hornish
By Paul O. Piper
Atty.

Reissued Nov. 24, 1942

Re. 22,225

UNITED STATES PATENT OFFICE 22,225

TRACTOR DRAWN IMPLEMENT

Mars M. Hornish, Washington, Ill., assignor to International Harvester Company, Chicago, Ill., a corporation of New Jersey Original No. 2,263,089, dated November 18, 1941, Serial No. 367,760, November 29, 1940. Application for reissue May 27, 1942, Serial No. 444,720

10 Claims. (Cl. 55—81)

This invention relates to the adjustment of a tractor drawn implement. More specifically it relates to the adjustment of a trail-behind implement such as a harrow by means of tractor power and to the automatic setting of the working position of the harrow.

It has been known to provide a harrow pulled behind a tractor with a fluid-power device actuated by the tractor for adjusting the gangs of the harrow. The application of such a fluid-power device to a harrow presents a special problem. The adjustment of the working position of a harrow also presents problems.

An object of the present invention is to provide an improved means for adjusting by tractor power a tractor-drawn implement.

A further object is the provision for means for adjusting a tractor-drawn harrow by means of tractor power.

A further object is the provision of means for adjusting an implement, which means provides an automatic stop for the implement in working position and allows the implement to be set by hand in any position intermediate working position and transport position.

According to the present invention, a disk harrow is connected with the rear of a tractor and is adjusted by means of a fluid-power device mounted on the harrow. A bar having ratchet teeth is slidably mounted on the frame of the harrow and connected with the harrow gang. A latch member is resiliently held out of engagement with the ratchet teeth, but may be actuated either by hand or by removal of the resilient means to engage any one of the ratchet teeth and thereby to limit the movement of the harrow gang into working position. The bar is provided with a stop mounted thereon for adjustment therealong and projects from the bar so as to constitute in effect, a raised tooth which is automatically engaged by the latch upon sufficient movement of the bar with respect to the frame.

Figure 1:
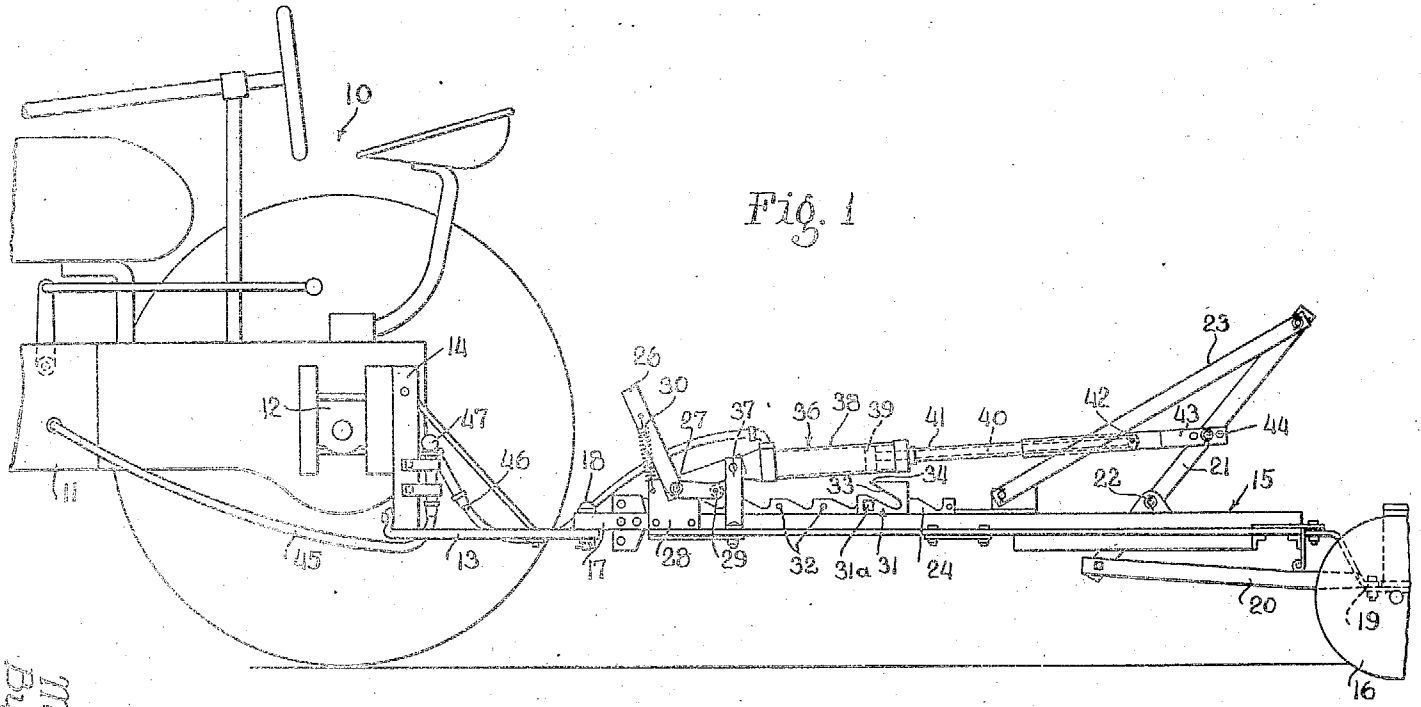
Figure 1 is a side view of a tractor and a harrow in transport position connected thereto employing the novel adjusting means of the present invention.

A tractor 10 has a body 11, a rear axle 12, and a draw-bar 13 connected to the rear axle by means of a structure 14. A harrow comprising a frame 15 and a pair of gangs 16, only one of which is shown, is connected to the tractor draw-bar 13 by means of a draft head 17 slidably mounted on the frame 15 and attached to the draw-bar by means of a bolt 18. The harrow has two gangs 16, of which only one is shown, each gang being connected adjacent its outer end to the frame 15 as at 19. A link 20 connects the inner end of each gang and the lower end of a lever 21 pivotally mounted at a mid-point on a horizontal axis as at 22 on the frame 15. A link 23 connects the upper end of the lever 21 and a bar 24 having ratchet teeth 25 and secured to the slidable draft head 17. A pair of bell cranks 26 is pivotally mounted on a common axis as at 27 on a pair of upstanding members 28 secured to the front gang 15. The end of the bell cranks have vertical arms secured to one another and horizontal arms which are spaced and between which extends a pin 29 which is adapted to engage any of the ratchet teeth 25, but is normally held out of engagement therewith by means of a spring 30 which connects the vertical arms of the bell cranks 26 and one upstanding member 28. A stop member 31 is mounted on the bar 24 and is secured thereto by means of a bolt 31*a* passing through the stop member and any one of a plurality of holes 32 in the bar. The stop member has a slot 33 and a portion 34 projecting above the bar, which in effect, constitute a ratchet tooth positioned so as to engage the pin 29.

Figure 2:
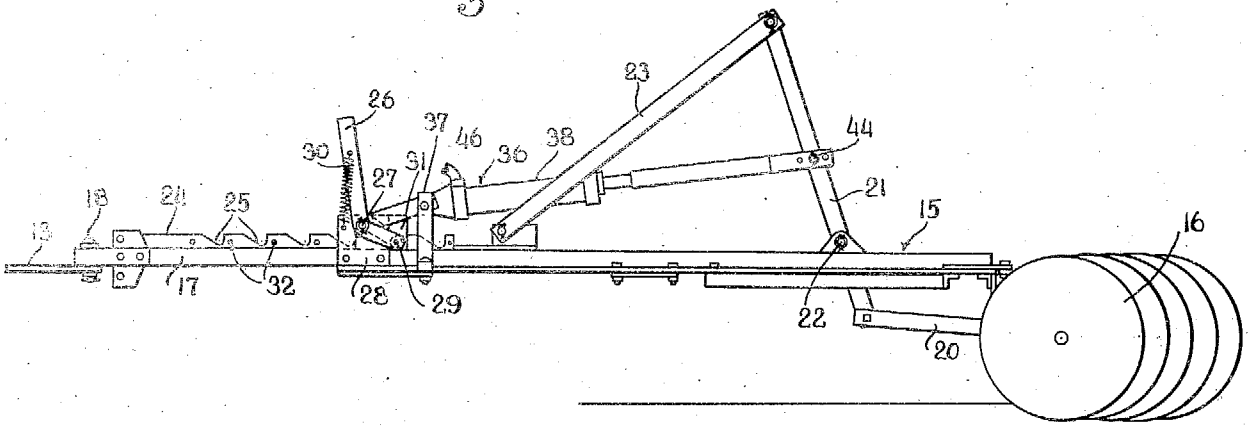
Figure 2 is a similar view with the harrow in working position.
Figure 3:
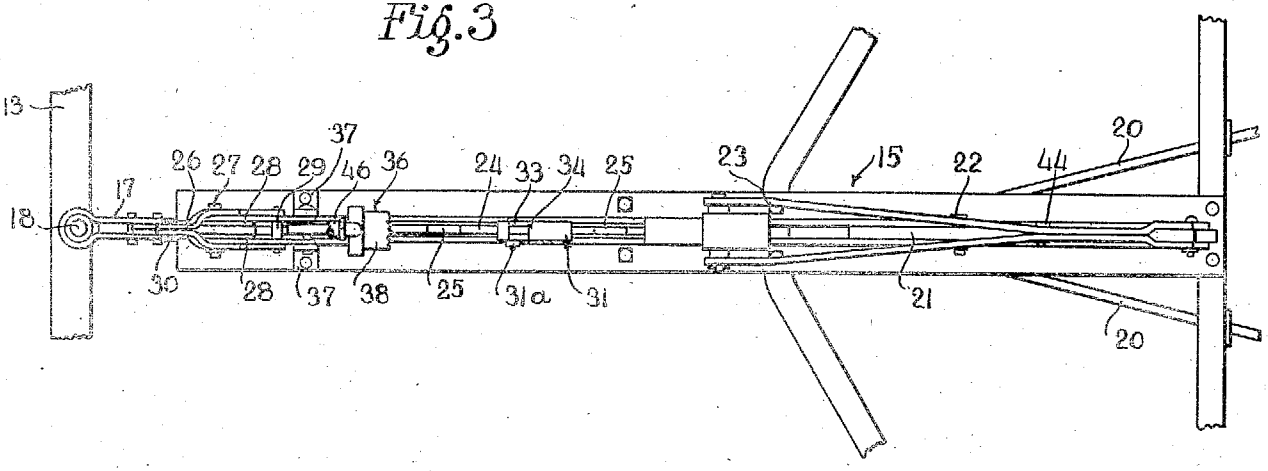
Figure 3 is a plan view of a portion of the harrow and the tractor draw-bar.

Figure 1 shows the harrow in transport position. When it is desired to shift the harrow to working position, a forward pull on the harrow causes drag of the ground upon the gangs to move the inner ends thereof rearwardly. As a result, the link 23 and bar 24 move forwardly until the latch 29 engages the slot 33 in the stop member 31 as shown in Figure 2. Further movement of the harrow gangs is prevented. The stop member 31 thus serves to predetermine the working position of the harrow gangs, and its position along the bar 24 may be varied for a variation of the working position of the gang. If it is desired to set the harrow in some intermediate working position between transport position and the predetermined working position, the bell crank 26 may be rotated manually against the spring 30 to bring the pin 29 into the engagement with a notch 25, or else, the spring 30 may be disconnected and the latch allowed to drop into the path of the ratchet teeth 25.

A fluid-power device 36 is mounted on upstanding members 37 secured to the harrow frame 15. This device is as shown in the patent to Lindgren 2,156,570, and comprises essentially a cylinder 38, a piston 39 slidably mounted within the cylinder 38, and a rod 40 secured to the piston and extending from the cylinder 38. The rod extends through a sleeve 41 formed as an extension of the cylinder 38 and abuts a stop member 42 secured with a sleeve 43 slidably embracing the sleeve 41. The end of the sleeve 43 is connected as at 44 to the lever 21 at a point intermediate the upper end and the pivot mounting 22 on the frame 15. Fluid under pressure is supplied to the fluid-power device by means of conduits 45 and 46 joined to one another by means 47 forming disconnectable couplings from which escape of fluid is prevented when the conduits are disconnected. This means is more fully disclosed and claimed in applicant's copending application, Serial Number 367,759, filed November 29, 1940. When it is desired to shift the gang from working position to transport position, fluid under pressure is supplied to the cylinder 38 to move the piston 39 rearwardly. The result is that the lever 21 is rotated clockwise and moves the link 20 and the inner ends of the harrow gangs of the harrow forwardly. During transport of the harrow the gangs are kept in transport position by means of continuously applied pressure against the piston 39 or by engagement of the pin 29 with a latch tooth 25.

It will be apparent from the foregoing description that a new and novel construction has been provided by which the adjustment of an implement is effected by means of a fluid-power device mounted on the implement, and means are provided by which the implement is automatically limited in its movement to a predetermined working position and may be held manually to an intermediate position. The intention is to limit the invention only within the scope of the appended claims.

What is claimed is:

1. In combination, a tractor having a power plant, a harrow connected at the rear of the tractor and comprising a frame, a gang movably connected therewith, a lever pivoted between its ends on a horizontal axis on the frame, means connecting the lower end of the lever and the gang, a member having ratchet teeth, means connecting the upper end of the lever and the member, an element connected with the frame and engageable with the ratchet teeth, means holding the element out of engagement with the ratchet teeth, an adjustable stop mounted on the member having the ratchet teeth and engageable with the element to limit the working position of the gang, a fluid-power device mounted on the frame and connected with the lever at a point intermediate the upper end and the frame, and means connecting the fluid-power device and the tractor power plant.

2. In combination, a tractor having a power plant, a harrow connected at the rear of the tractor and comprising a frame, a gang movably connected therewith, a lever mounted between its ends on a horizontal axis on the frame, means connecting the lower end of the lever and the gang, a member having ratchet teeth and mounted on the frame, an element connected with the frame and engageable with the ratchet teeth, means connecting the member and the upper end of the lever, a fluid-power device mounted on the frame and connected with the lever at a point between its upper end and the frame, and means connecting the device and the tractor power plant.

3. A harrow comprising a frame part, a gang part movably connected therewith, an element connected with one part, a first means connected with the other part and having for a considerable amount of its length a portion engageable with the element so as to prevent movement of the gang in the direction of its working position, means holding the element out of engagement with the portion and a second means mounted on the first means for adjustment along the length of the said portion on the first means and projecting therefrom so as to engage the element upon movement of the gang and thereby to limit the working position of the gang.

4. A harrow adapted to be connected in trail-behind relation to a tractor and comprising a frame part, a gang part, a first means connected with one part and comprising a portion having a series of teeth, an element connected with the other part and being manually engageable with the teeth to hold the gang part against movement in the direction of a full working position in any of a number of positions between transport position and working position, stop means positioned for adjustment along the portion having teeth for providing a variable limit to the movement of the gang part in the direction of full working position, and a fluid-power device mounted on the harrow frame part and powered by the tractor for moving the gang part in the direction of transport position.

5. A harrow adapted to be connected in trail-behind relation to a tractor and comprising a frame part, a gang part, a first means connected with one part and comprising a portion having a series of teeth, an element connected with the other part and being manually engageable with the teeth to hold the gang part against movement in the direction of a full working position in any of a number of positions between transport position and working position, means positioned for adjustment along the portion having teeth and adapted to cause holding between the element and the portion having teeth for providing a variable limit to the movement of the gang part in the direction of full working position, and a fluid-power device mounted on the harrow frame part and powered by the tractor for moving the gang part in the direction of transport position.

6. A harrow comprising a frame, a gang movably connected thereto, means for limiting the movement of the gang with respect to the frame in the direction of working position, said means comprising parts connected, respectively, to the frame and to the gang and comprising portions mutually engageable to prevent relative movement between the gang and the frame in a number of positions of the gang with respect to the frame, means holding the portions out of mutual engagement, and means acting against the action of the holding means to effect engagement of the portions upon movement of the gang to a predetermined position with respect to the frame in the direction of working position.

7. A harrow as specified in claim 6, the mutually engageable portions, when in engagement, permitting movement of the gang in a direction away from working position and preventing movement in the opposite direction.

8. An implement comprising a frame, an adjustable element movably connected thereto, and means for limiting the movement of the element with respect to the frame in the direction of working position, said means comprising parts connected, respectively, to the frame and to the element and comprising portions mutually engageable to prevent relative movement between th element and the frame in a number of positions of the element with respect to the frame, means holding the portions out of mutual engagement, and means acting against the action of the holding means to effect engagement of the portions upon movement of the element to a predetermined position with respect to the frame in the direction of working position.

9. A harrow comprising a frame part, a gang part movably connected therewith, a member having a series of notches and connected with one part, an element connected with the other part and engageable with any of the notches in the member to prevent relative movement between the parts, means preventing engagement of the element with the notches, and means acting against the action of the last-mentioned means to cause engagement between the element and one of the notches in the member upon movement of the gang part to a certain position with respect to the harrow part.

10. A harrow comprising a frame part, a gang part movably connected therewith, a member connected with one part and having a series of ratchet teeth, an element connected with the other part and engageable with any of the ratchet teeth to prevent movement of the gang part with respect to the frame part in the direction of working position, resilient means holding the element and the ratchet teeth out of engagement, and means adjustably connected with the member having the ratchet teeth and engageable with the part connected to the element for causing engagement of the element and the ratchet teeth against the action of the resilient means.

MARS M. HORNISH.